United States Patent
Robideau

[19]

[11] Patent Number: 5,988,403
[45] Date of Patent: Nov. 23, 1999

[54] BICYCLE DISPLAY RACK

[75] Inventor: Thomas J. Robideau, Paxton, Mass.

[73] Assignee: Spencer Products, Inc., North Brookfield, Mass.

[21] Appl. No.: 09/151,181

[22] Filed: Sep. 10, 1998

Related U.S. Application Data

[60] Provisional application No. 60/059,390, Sep. 19, 1997.

[51] Int. Cl.⁶ ........................................................ A47F 7/00
[52] U.S. Cl. ................................. 211/20; 224/924; 211/17
[58] Field of Search .................................. 211/17, 20, 22, 211/18; 224/924

[56] References Cited

U.S. PATENT DOCUMENTS

| | | | |
|---|---|---|---|
| 4,015,718 | 4/1977 | Bernard | 211/20 X |
| 4,442,961 | 4/1984 | Bott | 211/20 X |
| 4,452,384 | 6/1984 | Graber | 211/20 X |
| 4,802,594 | 2/1989 | Graber | 211/20 |
| 5,549,231 | 8/1996 | Fletcher et al. | 211/20 X |
| 5,560,498 | 10/1996 | Porter | 211/20 |

*Primary Examiner*—Robert W. Gibson, Jr.
*Attorney, Agent, or Firm*—Blodgett & Blodgett, P.C.

[57] ABSTRACT

A display rack for a bicycle having an elongated supporting base, a front wheel stop mounted to the front end of the supporting base for maintaining the front wheel of the bicycle in a stable vertical position and a carriage which is freely movable longitudinally on the supporting base for supporting and retaining the rear wheel of the bicycle. The display rack is inclined from front to back so that the carriage is biased forwardly by gravity and the front wheel of the bicycle rests against the front wheel stop.

16 Claims, 9 Drawing Sheets

BICYCLE DISPLAY RACK

CROSS-REFERENCE TO RELATED APPLICATIONS

This application claims the benefit under 35 U.S.C. §119 (e) of prior U.S. Provisional Application Ser. No. 60/059,390 filed Sep. 19, 1997 which is hereby incorporated by reference.

STATEMENT REGARDING FEDERALLY SPONSORED RESEARCH OR DEVELOPMENT

This invention has been created without the sponsorship or funding of any federally sponsored research or development program.

BACKGROUND OF THE INVENTION

The present invention is generally directed to a rack for supporting and displaying a bicycle in a retail establishment.

In retail outlets, it is important, in terms of sales, to display merchandise being sold. It is also important that the merchandise be accessible for close examination and self-service if a decision is made by the customer to purchase the item. For relatively large and difficult to handle items, such as bicycles, proper display and accessibility is difficult to achieve without committing a great deal of floor space for the item. In order to maximize the use of floor space, racks are employed to support and stack the bicycles at different levels. This enables the bicycles to be well displayed, but the bicycles are not necessarily accessible. Since there are so many makes, sizes, and styles of bicycles, it is important for a customer to be able to handle and examine the bicycle. It is difficult and awkward for a customer or a sales clerk to remove a bicycle from its support, particularly if the bicycle is at a high level. The stacked bicycles also represent a potential hazard, unless great care is used by the customer in removing the bicycle from its support. The customer can be injured when removing a single bicycle. If the entire bicycle supporting structure is unstable, an attempt by the customer to remove one bicycle from the structure could cause several bicycles to fall from their supports, thus creating a serious hazard to customers, sales persons and anyone else in the immediate vicinity of the bicycle display area. Even if the bicycle supporting structure is relatively stable, a customer may be reluctant to remove a bicycle from its support if it appears that the removal of the bicycle would be difficult, or inconvenient. As a result, a customer is unlikely to purchase a bicycle without being able to examine the bicycle closely. These and other difficulties experienced with the prior art coating systems have been obviated by the present invention.

It is, therefore, an object of the invention to provide a bicycle display rack which enables a plurality of bicycles to be well displayed in a relatively small area.

Another object of the invention is to provide a bicycle display rack which supports a bicycle in a very secure and stable manner.

A further object of the invention is to provide a bicycle display rack which enables the bicycle to be removed easily and conveniently from the rack for close inspection by a customer, and easily and conveniently replaced in the rack.

SUMMARY OF THE INVENTION

A display rack for a bicycle having an elongated supporting base, a front wheel stop mounted to the front end of the supporting base for maintaining the front wheel of the bicycle in a stable vertical position and a carriage which is freely movable longitudinally on the supporting base for supporting and retaining the rear tire of the bicycle. The display rack is inclined from front to back so that the carriage is biased forwardly by gravity and the front wheel of the bicycle rests against the front wheel stop.

BRIEF DESCRIPTION OF THE DRAWINGS

The character of the invention, however, may be best understood by reference to one of its structural forms, as illustrated by the accompanying drawings in which.

DETAILED DESCRIPTION OF THE INVENTION

Figure 1:
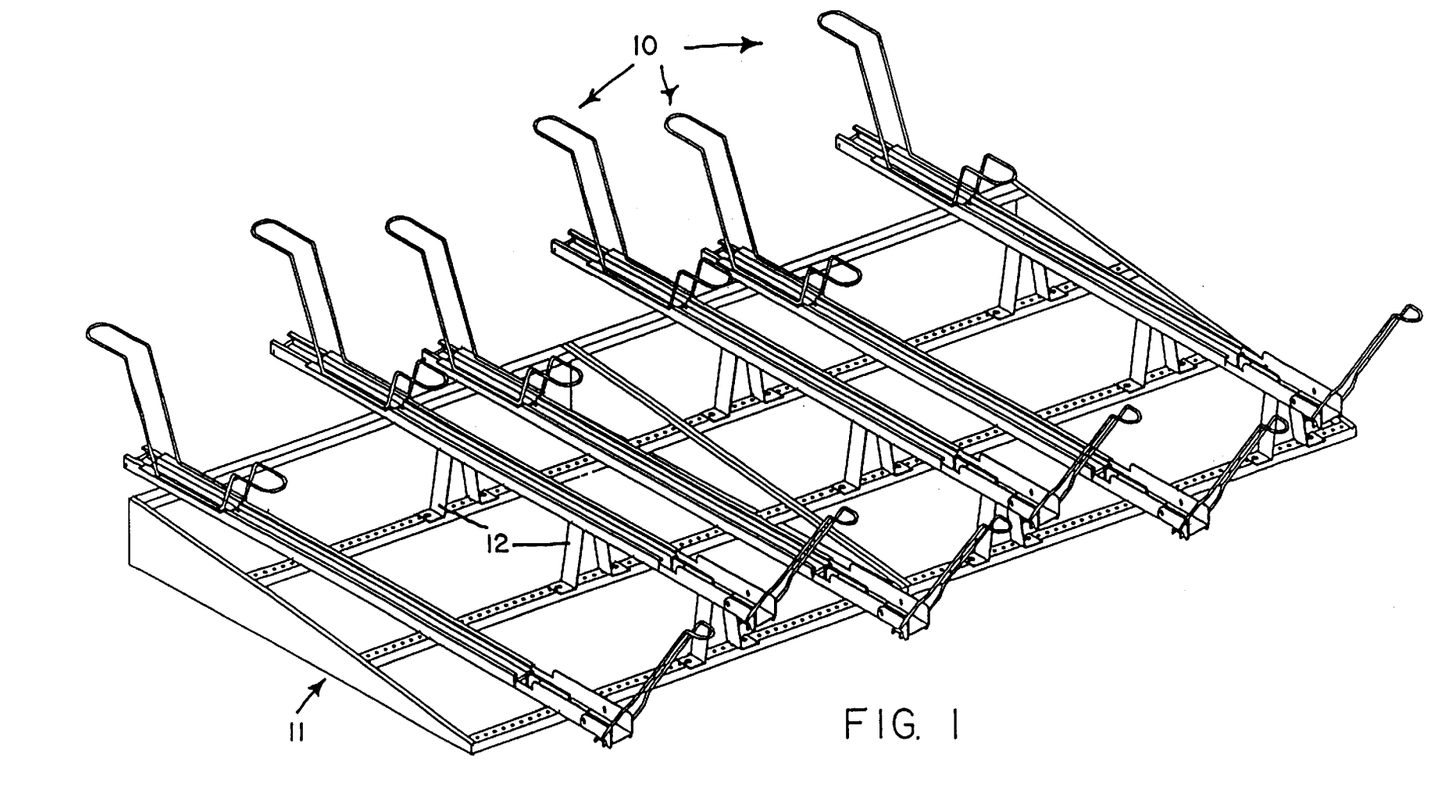
FIG. 1 is an isometric view of a plurality of bicycle display racks which embody the principles of the present invention.

Referring first to FIG. 1, there is shown a plurality of bicycle display racks of the present invention, generally indicated by the reference numeral 10. A first group of racks 10 are mounted directly on a supporting frame, generally indicated by the reference numeral 11. Optionally, a second group of racks 10 are mounted on support brackets 12 which are, in turn, fastened to the supporting frame 11 so that the second group of racks are substantially higher than the first group of racks. Preferably, all of the bicycle support racks 10 on the supporting frame incline downwardly from front to back.

Typically, there are a set of racks at the floor level and two more sets of racks mounted at a second and a third level above the floor level racks. Each level is separated by a sufficient distance to allow bikes to be placed between the levels.

Figure 2:
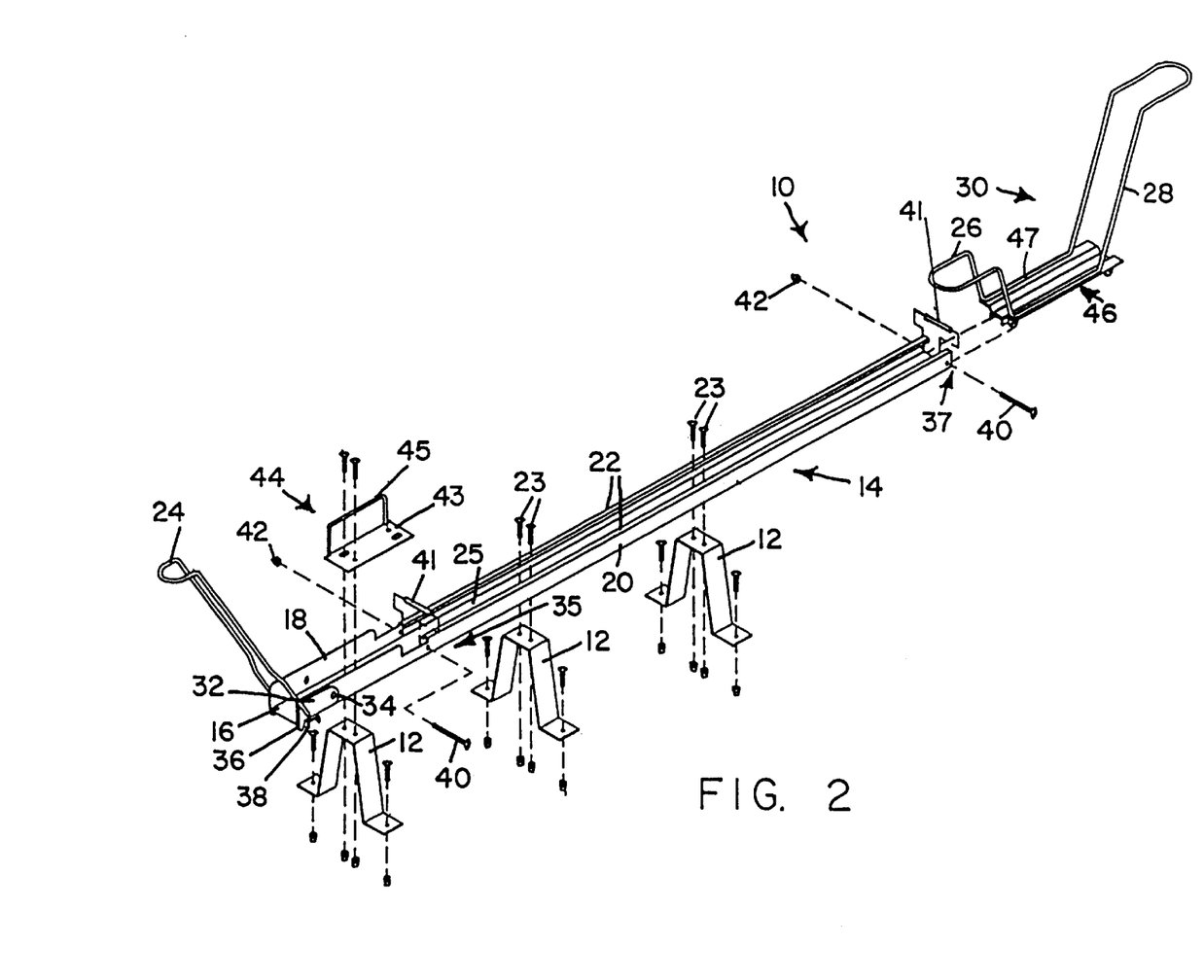
FIG. 2 is an isometric exploded view of the display rack of the present invention.
Figure 3:
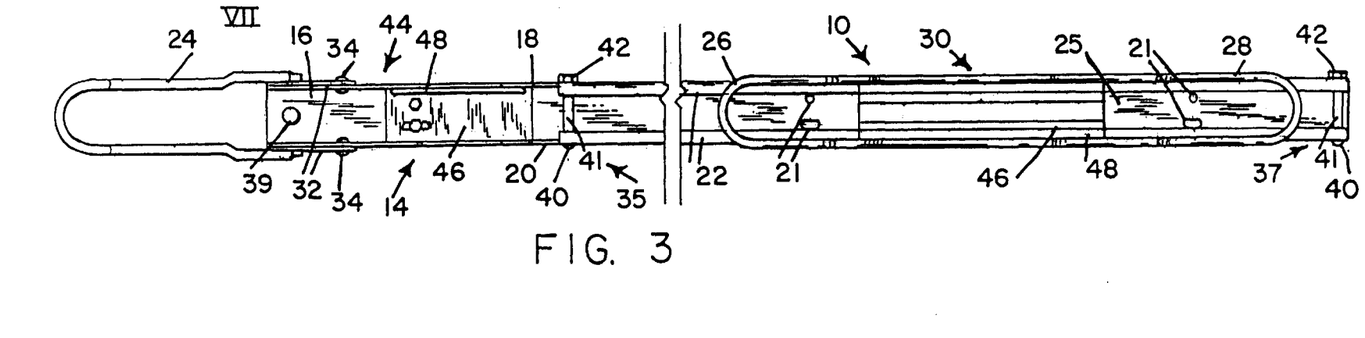
FIG. 3 is a top plan view of a bicycle display rack.
Figure 4:
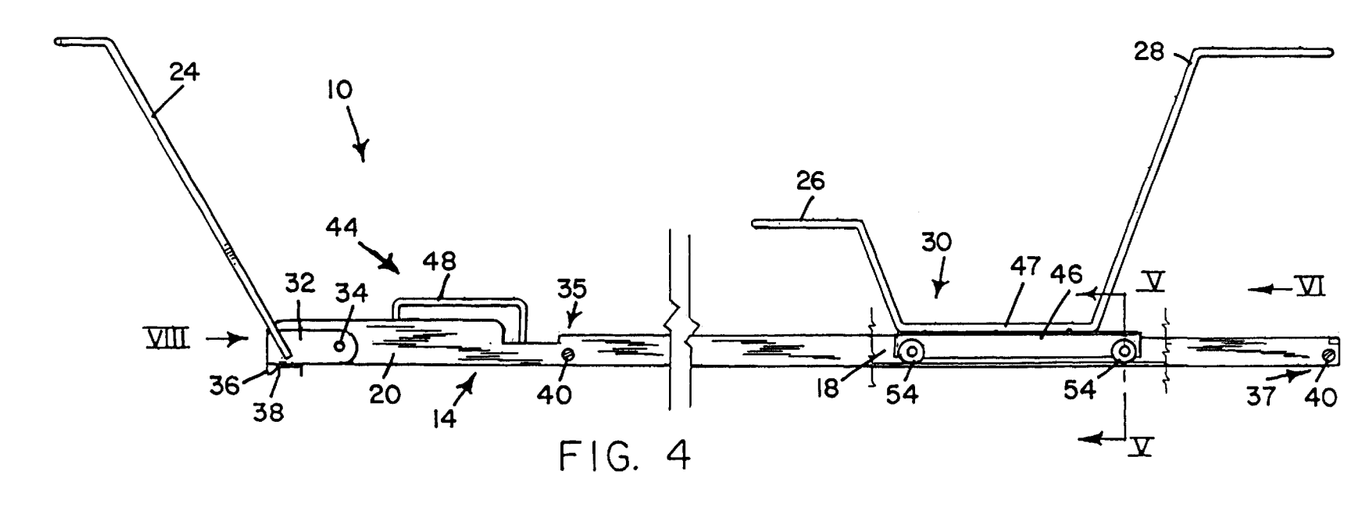
FIG. 4 is a side elevational view of the bicycle display rack.

Referring specifically to FIGS. 2–4, each bicycle support rack 10 comprises a supporting base, generally indicated by the reference numeral 14, a front wheel stop 24 which, in the preferred embodiment, is in the form of an inverted U-shaped bail and a carriage, or trolley, generally indicated by the reference numeral 30.

The supporting base 14 is U-shaped in cross-section and comprises a bottom wall 16, a pair of sidewalls 18 and 20, and a pair of retaining rails 22 fixed to the tops of the sidewalls 18 and 20. The bottom wall 16 has an upper surface 25 and a plurality of apertures 21 which enable the rack 10 to be mounted directly to the supporting frame 11 or to the support brackets 12 by bolts 23.

Figure 8:
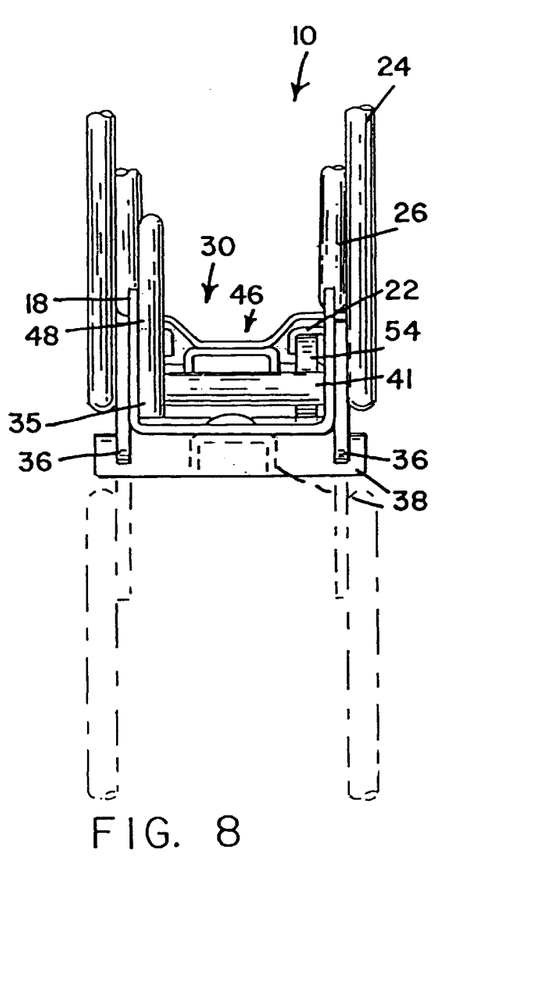
FIG. 8 is a front elevational view of the bicycle display rack.

The front wheel stop 24 is fixed, as for example by welding, to a pair of spaced levers 32 which are pivotally connected to the sidewalls 18 and 20 by pivot pins 34. The forward end of each lever 32 has a downwardly extending dog 36. A bar-shaped retainer 38 is pivotally connected to the bottom wall 16 by a pivot pin 39 for rotation about a vertical axis from a retaining position shown in full lines in FIG. 8 to a release position shown in dot-and-dash lines in FIG. 8. When the retainer 38 is in its active or supporting position, it extends transversely of the longitudinal axis of the supporting base 14. The retainer 38 is located directly beneath the levers 32 to prevent the levers 32 from pivoting downwardly below the bottom wall 16 and to maintain the front wheel stop 24 in its upper wheel supporting position as shown in FIG. 4. When the retainer 38 is in its inactive or release position, it extends along the central longitudinal axis of the supporting base 14, out of alignment with the levers 32. This enables the levers 32 to pivot downwardly, wherein the front wheel stop 24 extends below the bottom wall 16 of the supporting base 14. The dog 36 extends in front of the retainer 38 when the retainer 38 is in its supporting position to prevent the retainer 38 from rotating to its release position. The retainer 38 can only be moved to its release position by raising the levers 32 slightly so that the dog 36 is above the retainer 38. This enables the retainer 38 to be rotated 90° to its release position.

A forward carriage stop, generally indicated by the reference numeral 35, is located near the front end of the supporting base 14 and a rearward carriage stop, generally indicated by the reference numeral 37, is located adjacent the rear end of the supporting base. Each of the carriage stops 35 and 37 comprises a bolt 40 which extends freely through the apertures in the sidewalls 18 and 20 and a sleeve 41. The bolt 40 can also function as a stop without the sleeve 41. The outer end of the bolt 40 extends beyond the sidewall 18 and is secured by a nut 42. The stops 35 and 37 limit the forward and rearward movements, respectively, of the carriage 30. Preferably, a spacer for the front wheel of the bicycle is located adjacent the front end of the supporting base 14. The spacer is generally indicated by the reference numeral 44 and comprises a horizontal plate 43 which is bolted to the bottom wall 16 of the supporting base and an inverted U-shaped rod 45 which is fixed to the plate 43 and which extends upwardly along the inner surface of the sidewall 18. The spacer 44 helps to support the front wheel of the bicycle and enables the front wheel of the bicycle to fit more snugly on the supporting base.

Figure 5:
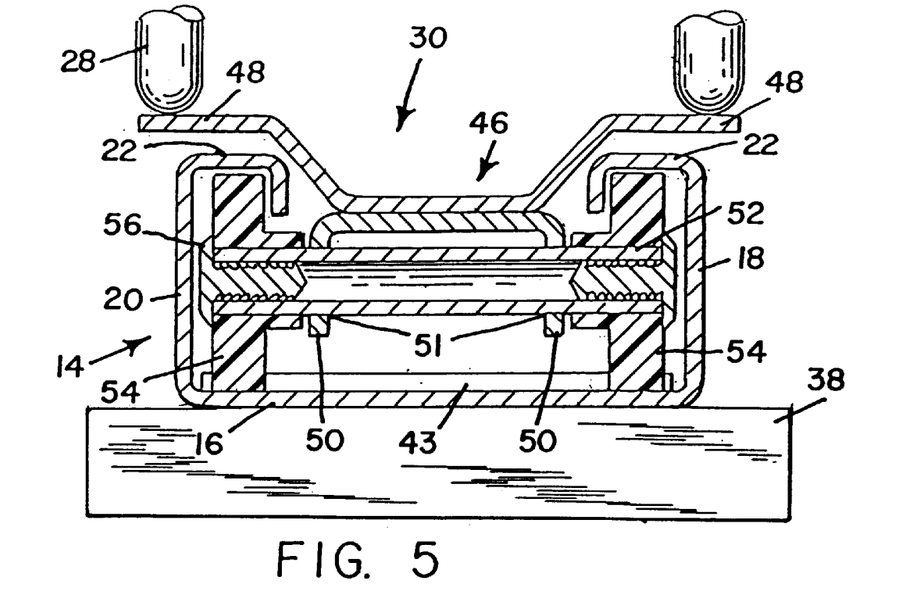
FIG. 5 is a vertical cross-sectional view of the bicycle display rack, taken along the line V—V of FIG. 4 and looking in the direction of the arrows.
Figure 6:
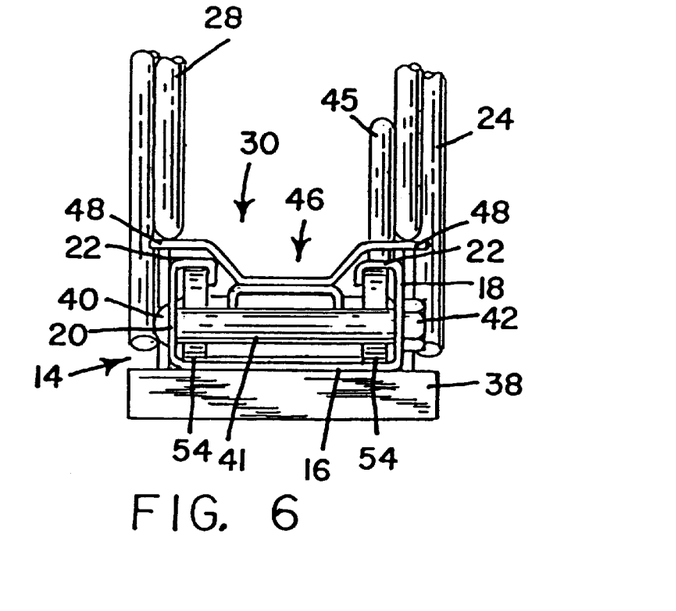
FIG. 6 is a rear elevational view of a bicycle display rack.
Figure 7:
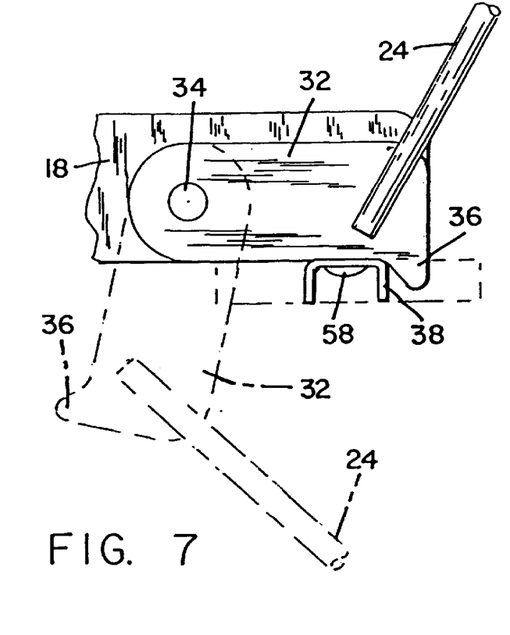
FIG. 7 is a fragmentary side elevational view of the front end of the bicycle display rack, looking in the direction of arrow VII of FIG. 3.

Referring to FIGS. 4 and 5, the carriage 30 includes a frame, generally indicated by the reference numeral 46 and a pair of spaced inverted U-shaped bails 26 and 28. The bail 26 functions as a forward wheel stop. The bail 28 functions as a rearward wheel stop. The frame 46 has a pair of upwardly and outwardly extending flanges 48. The outer ends of the flanges 48 are located above the rails 22 and are fixed to the bails 26 and 28. The bails 26 and 28 are formed from a single continuous rod which includes a pair of horizontal sections 47 which connect the bails 28 and 26 and which are welded to the flanges 48. The frame 46 has a pair of spaced downwardly extending flanges 50. Each of the flanges 50 has a pair of spaced apertures 51 for receiving a pair of tubular shafts 52. Each shaft 52 extends beyond the flanges 50 for rotatably supporting a pair of wheels 54. The wheels 54 rest on the upper surface 25 of the bottom wall 16. A friction retainer 56 is located in the open end of each shaft 52 for retaining the wheels 54 on the shafts 52.

Figure 9:
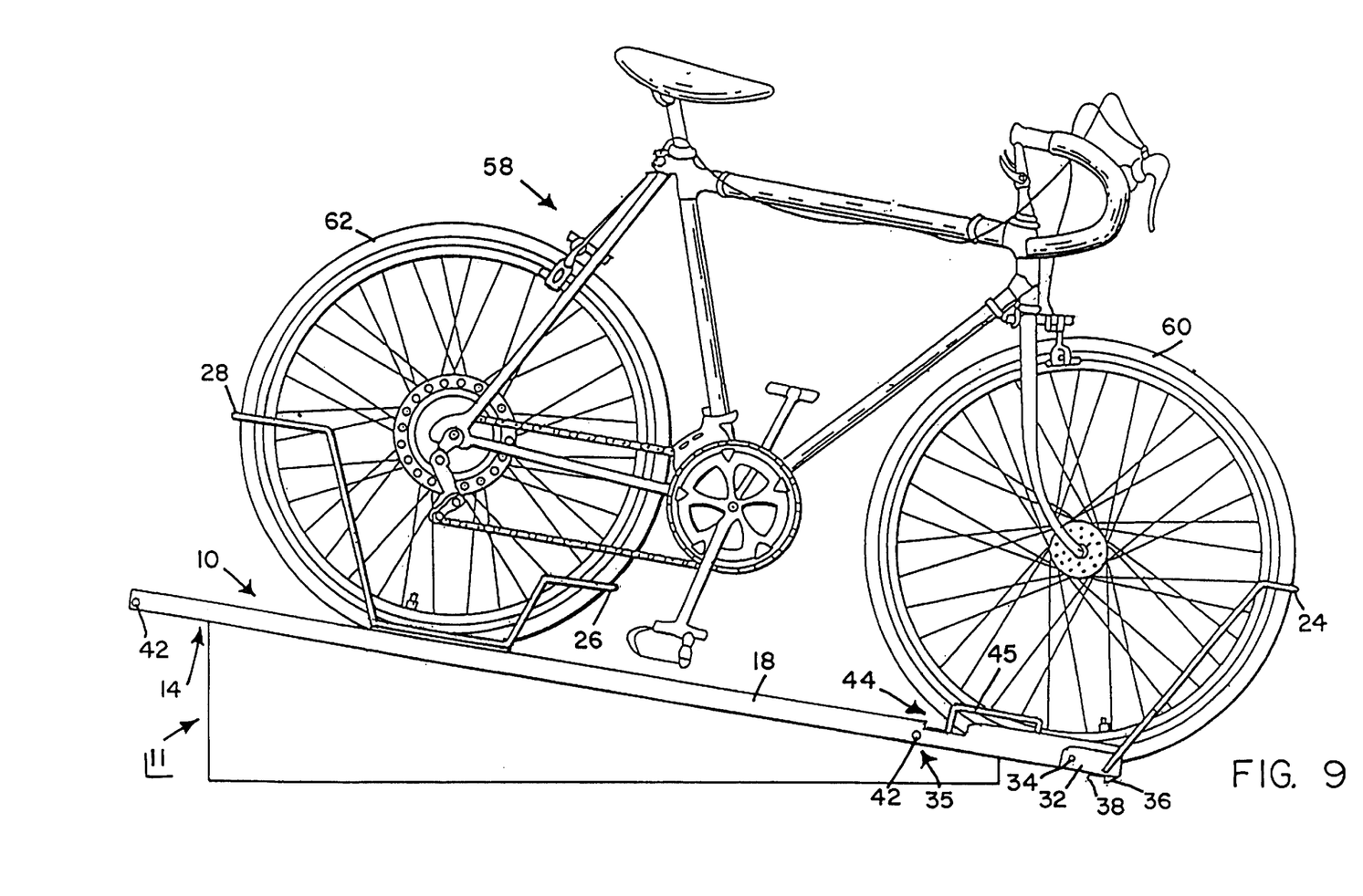
FIG. 9 is a side elevational view of the bicycle display rack with a bicycle mounted thereon.
Figure 10:
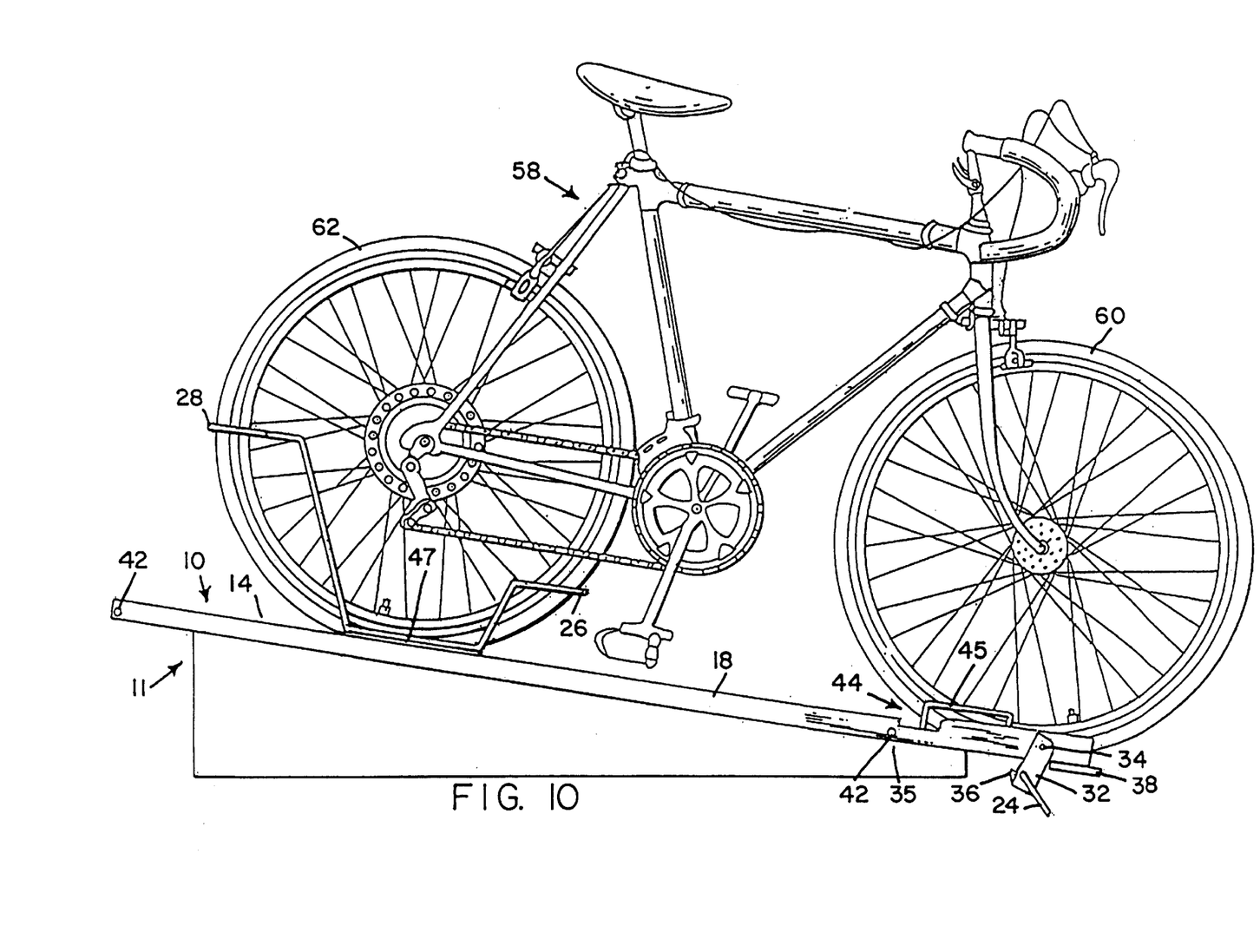
FIG. 10 is a view similar to FIG. 9 showing the front supporting stop for the front wheel of the bicycle in a non-supporting position.
Figure 11:
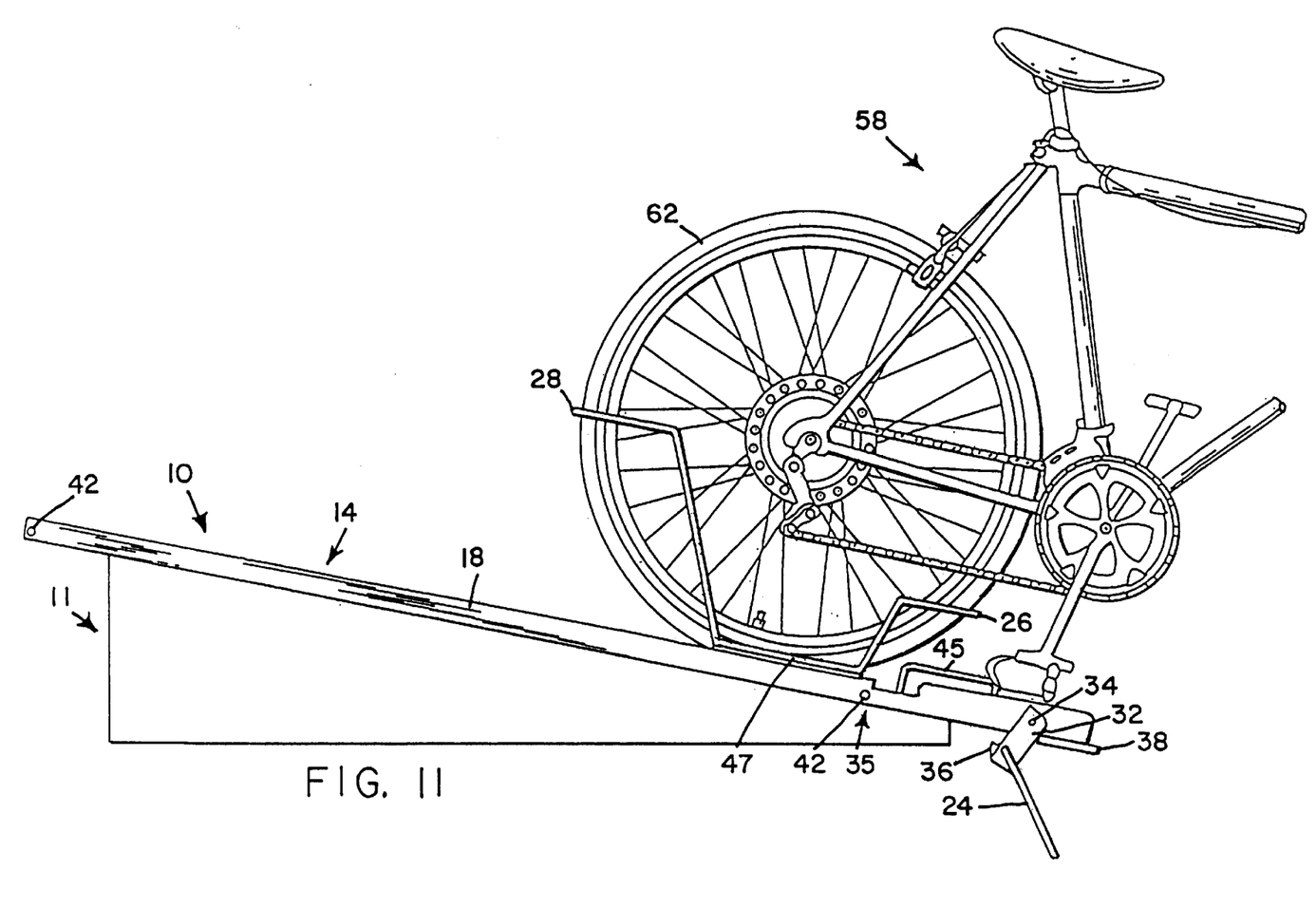
FIG. 11 is a view similar to FIG. 9 showing the bicycle in its forward position on the bicycle display rack just prior to removal of the bicycle from the rack.

Referring to FIGS. 9–11, a bicycle, generally indicated by the reference numeral 58 is shown supported on the bicycle display rack 10 of the present invention. The bicycle rack 10 is bolted to the supporting frame 11, so that the upper surface 25 of the bike rack 10 is inclined from the front end of the rack to the rear end of the rack. The front wheel 60 of the bicycle rests against the front wheel stop 24. The rear wheel 62 of the bicycle is cradled between the bails 26 and 28, as shown in FIG. 9, for retaining the rear wheel 62 on the carriage 30. The bails 24, 26 and 28 maintain the bicycle 58 in a stable vertical position. When it is desired to remove the bicycle for inspection by a customer, or for any other reason, the front wheel stop 24 is pushed rearwardly so that the levers 32 are rotated upwardly sufficiently to lift the dog 36 above the retainer 38. This enables the retainer 38 to be rotated 90° to its front-to-back orientation as shown in FIG. 10. When the front wheel stop 24 is pushed rearwardly for releasing the retainer 38, the bicycle moves rearwardly as well, this motion being facilitated by the fact that the rear wheel 62 is supported on the free wheeling carriage 30. The levers 32 can be pivoted about the pivot pin 34 to position the front wheel stop 24 below the supporting base 14, as shown in FIG. 10. Once the front wheel 60 of the bicycle is free of the front wheel stop 24, the bicycle can be pulled forwardly. The rear wheel 62 remains cradled and retained on the carriage between the forward bail 26 and the rearward bail 28 as the carriage 30 rolls forwardly until it hits the forward wheel stop 35, as shown in FIG. 11. At this point, the bicycle is in its forwardmost position. The bicycle is also forward of and relatively clear of the other bicycles on the supporting frame 11. Also, the front wheel 60 of the bicycle is supported on the floor (at least for the floor-level tier of racks), requiring only that the rear wheel of the bike be lifted from its cradled position between the bails 26 and 28 to complete the removal of the bicycle from the bicycle display rack 10. This process is reversed to replace the bicycle on the display rack 10.

Figures 12, 13:
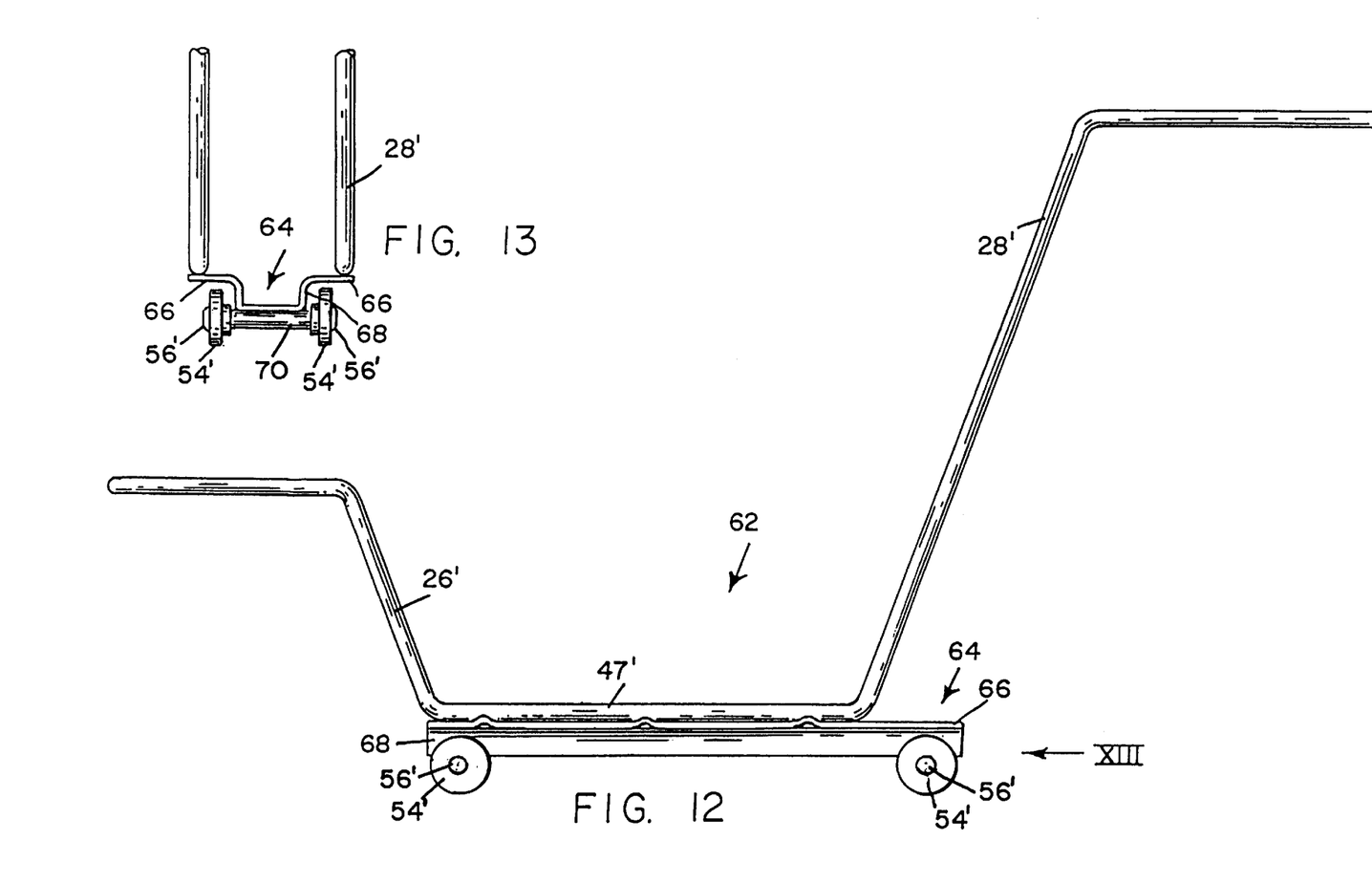
FIG. 12 is a side elevational view of a modified carriage.
FIG. 13 is a fragmentary end view of the modified carriage, looking in the direction of arrow XIII of FIG. 12.

Referring to FIGS. 12 and 13, there is shown a modified carriage, generally indicated by the reference numeral 62. The carriage 62 includes a frame, generally indicated by the reference numeral 64. The frame 64 has a u-shaped base 68 and a pair of flanges 66 extending outwardly from the base 68. The carriage 62 supports a pair of spaced bails 25' and 28' which are connected by a pair of horizontal sections 47'. The bails 26' and 28' and connecting sections 47' are formed from a single continuous rod and are identical to the bails 26 and 28. The sections 47' are welded to the flanges 66. A pair of spaced cylindrical tubes 70 are welded to the bottom of the base 68 at opposite ends of the frame 64. A pair of wheels 54' are rotatably mounted on the ends of the tubes 70. A friction retainer 56' is located in each open end of the tube 70. The wheels 54' and the retainers 56' are identical to the wheels 54 and retainers 56 of the carriage 30 of the embodiment as shown in FIG. 5. The carriage 62 functions in the same manner as the carriage 30.

The invention having been thus described, what is claimed as new and desired to secure by Letters Patent is:

What is claimed:

1. A display rack for supporting a bicycle having a frame, a front wheel and a rear wheel, said display rack comprising:

(a) an elongated supporting base having a front end and a rear end and an upper surface;

(b) a front wheel stop mounted to the front end of said supporting base for engaging the front wheel of said bicycle and for maintaining said front wheel in a stable vertical position; and (c) a carriage for supporting and retaining the rear wheel of said bicycle in a stable vertical position, said carriage being mounted on said supporting base for free longitudinal movement between said front end and said rear end so that when said supporting frame is inclined from front to back, said carriage is biased by gravity toward said front wheel stop and so that when a bicycle is supported on said supporting base with said front wheel resting on said upper surface and said rear wheel resting on said carriage, said bicycle is biased by gravity toward said front wheel stop.

2. A display rack as recited in claim 1, wherein said carriage has a plurality of wheels mounted for rotation on said carriage and for supporting said carriage and, wherein said supporting base has an upper surface for supporting the wheels of said carriage and a guide structure for restricting said carriage to longitudinal rolling on said upper surface between said front end and said rear end.

3. A display rack as recited in claim 1, wherein said carriage comprises:

(a) a frame having a forward end and a rearward end;

(b) a rearward wheel stop fixed to the rearward end of said frame;

(c) a forward wheel stop fixed to the forward end of said frame and spaced from said rearward wheel stop; and (d) a plurality of wheels rotatably mounted on said frame for supporting said carriage on said supporting base.

4. A display rack as recited in claim 3, wherein each of said front wheel stop, said rearward wheel stop and said forward wheel stop comprises a pair of spaced upwardly extending arms having respective upper ends joined by a horizontal arm, the space between each of said pairs of upwardly extending arms being adapted to receive a portion of a respective one said front and rear wheels for retaining said front and rear wheels.

5. A display rack as recited in claim 1, wherein said front wheel stop is pivotally connected to the front end of said supporting base for pivoting movement from an upper active position in front of said front wheel to an inactive position below said supporting base and, wherein said display rack further comprises a retainer mounted on said supporting base for movement between a first position for maintaining said front wheel stop in said active position and a second position for enabling said front wheel stop to pivot to said inactive position.

6. A display rack as recited in claim 5, wherein said front wheel stop comprises a pair of spaced rods having respective lower ends fixed to respective levers pivotally connected to said supporting base and said retainer is a bar located below said levers and pivotally connected to said supporting base for movement between said first position in which said bar extend transversely of said levers for supporting said levers to said second position in which said bar extends longitudinally of said levers and between said levers.

7. A display rack as recited in claim 6, wherein at least one of said levers has a downwardly extending dog which extends in front of said bar to prevent said bar from pivoting when said levers rest on said bar and wherein said bar is free to pivot upon pivoting of said levers upwardly so that said dog is above said bar.

8. A display rack as recited in claim 5, further comprising a carriage stop connected to said supporting base adjacent said front end for preventing said carriage from moving forward of said carriage stop.

9. A display rack as recited in claim 1, wherein said front stop has a slot for receiving a forward portion of said front wheel for retaining said front tire in a stable vertical position.

10. A display rack for a bicycle having a frame, a front wheel, a rear wheel, and an upper surface, said display rack comprising:

(a) a supporting frame having a front end and a rear end which is higher than said front end;

(b) an elongated supporting base having a front end, a rear end and an upper surface, said supporting base being mounted of said supporting frame so that said upper surface is inclined from the front end of said supporting base to the rear end of said supporting base;

(c) a front wheel stop fixedly mounted to the front end of said supporting base for engaging the front wheel of said bicycle and for maintaining said front wheel in a stable vertical position; and (d) a carriage for supporting and restraining the rear wheel of said bicycle, said carriage being mounted on the upper surface of said supporting base for free longitudinal movement between the front end of said supporting base and said rear end of said supporting base so that said carriage is biased by gravity toward said front wheel stop and so that when a bicycle is supported on said supporting base with said front wheel resting on said upper surface and said rear wheel resting on said carriage, said bicycle is biased by gravity toward said front wheel stop.

11. A display rack as recited in claim 10, wherein said carriage has a plurality of wheels mounted for rotation on said carriage for supporting said carriage and for rolling on said upper surface and, wherein said supporting base has a guide structure for restricting said carriage to longitudinal rolling on said upper surface between said front end and said rear end.

12. A display rack as recited in claim 10, wherein said carriage comprises:

(a) a frame having a forward end and a rearward end;

(b) a rearward wheel stop fixed to the rearward end of said frame; and (c) a forward wheel stop fixed to the forward end of said frame and spaced from said rearward wheel stop.

13. A display rack for a bicycle having a frame, a front wheel, a rear wheel, and an upper surface, said display rack comprising:

(a) an elongated supporting base having a front end, a rear end and an upper surface which is inclined from said front end to said rear end;

(b) a front wheel stop fixedly mounted to the front end of said supporting base for engaging the front wheel of said bicycle and for maintaining said front wheel in a stable vertical position; and (c) a carriage for supporting and retaining the rear wheel of said bicycle, said carriage being mounted on said supporting base for free longitudinal movement between said front end and said rear end so that said carriage is biased by gravity toward said front wheel stop and so that when a bicycle is supported on said supporting base with said front wheel resting on said upper surface and said rear wheel resting on said carriage, said bicycle is biased by gravity toward said front wheel stop.

14. A display rack as recited in claim 13, wherein said carriage has a plurality of wheels mounted for rotation on said carriage for supporting said carriage on said upper surface and, wherein said supporting base has a guide structure for restricting said carriage to longitudinal rolling on said upper surface between said front end and said rear end.

15. A display rack as recited in claim 13, wherein said carriage comprises:

(a) a frame having a forward end and a rearward end;

(b) a rearward wheel stop fixed to the rearward end of said frame; and (c) a forward wheel stop fixed to the forward end of said frame and spaced from said rearward wheel stop.

16. A display rack as recited in claim 15, wherein each of said front rearward and forward wheel stops comprises a pair of spaced upwardly extending arms having respective upper ends joined by a horizontal arm, the space between each of said pairs of upwardly extending arms being adapted to receive a portion of a respective one of said front and rear for retaining said front and rear wheels.

* * * * *